United States Patent [19]

Arismendi

[11] Patent Number: 4,742,347

[45] Date of Patent: May 3, 1988

[54] REFRESHING CIRCUIT FOR MULTI-PANEL DISPLAY

[75] Inventor: Armando Arismendi, Austin, Tex.

[73] Assignee: International Business Machines Corporation, Armonk, N.Y.

[21] Appl. No.: 820,455

[22] Filed: Jan. 17, 1986

[51] Int. Cl.$^4$ .............................................. G09G 1/16
[52] U.S. Cl. .................... 340/799; 340/717; 340/792; 340/802
[58] Field of Search ............... 340/717, 799, 800, 802, 340/804, 792, 716

[56] References Cited

U.S. PATENT DOCUMENTS

| | | | |
|---|---|---|---|
| 3,777,059 | 12/1973 | Wilkey, Jr. .......................... | 340/717 |
| 3,781,850 | 12/1973 | Gicca et al. .......................... | 340/717 |
| 3,787,834 | 1/1974 | Elliott .................................. | 340/324 |
| 3,816,824 | 6/1974 | Thust et al. .......................... | 340/789 |
| 4,113,381 | 9/1978 | Nakano ................................ | 340/800 |
| 4,462,026 | 7/1984 | Munday ............................... | 340/802 |
| 4,630,122 | 12/1986 | Morokawa ........................... | 340/784 |
| 4,642,621 | 2/1987 | Nemoto et al. ...................... | 340/799 |
| 4,649,379 | 3/1987 | Canton et al. ....................... | 340/799 |

OTHER PUBLICATIONS

IBM Technical Disclosure Bulletin, "Liquid Crystal Display System", vol. 16, No. 4, Sep. 1973.

*Primary Examiner*—Marshall M. Curtis
*Assistant Examiner*—Mahmoud Fatahi-Yar
*Attorney, Agent, or Firm*—Thomas E. Tyson

[57] ABSTRACT

An addressing circuit for providing character addresses to refresh a plurality of panels arranged to display a single image and including a circuit for providing a character counter across character line and a circuit for providing a character line count for each panel. The character count across the character line and the character line count are combined in another circuit to provide an address for each character successively along a panel scan line alternating between each respective scan line of the panels. In this manner, each scan line of the panels may be addressed in an alternating fashion to provide the required refresh signal to maintain the image on the display. Another address circuit is provided for outputting a character font scan line address and includes a circuit that provides a character code date for each character successively along a panel scan line alternating between each respective scan line of the panels and another circuit that provides the scan line count for each character in the same manner. The character code data and scan line count for each character are combined to form the character font scan line address. This character font scan line address is input to a memory which provides the font scan line data to a video circuit. The character address is also used to address attribute data which is combined in the video circuit with the character font scan line data to produce a video refresh signal for the multi-panel display.

7 Claims, 5 Drawing Sheets

REFRESHING CIRCUIT FOR MULTI-PANEL DISPLAY

TECHNICAL FIELD

This invention relates to the refreshing of a visual display and more specifically to the refreshing of a multi-panel display.

BACKGROUND ART

Traditional display devices such as liquid crystal displays require the data be continuously provided to them in a manner that refreshes the image on the display. For a single display containing multiple picture elements or pixels or pels, the refreshing is accomplished by providing a stream of data to the display where each invidual data element represents the state of a pel. In liquid crystal displays, this series of data represents consecutive series of lines on the display. Typical scheme for refreshing a liquid crystal display is disclosed in the IBM Technical Disclosure Bulletin entitled "Liquid Crystal Display System" by J. C. Elliott in Vol. 16, No. 4, page 1087 (September, 1973). In a corresponding patent, U.S. Pat. No. 3,787,834 discloses a liquid crystal display system that provides data to two liquid crystal display panels. The panels include liquid crystal display elements which are composed of segments.

DISCLOSURE OF THE INVENTION

In accordance with the present invention, an addressing circuit for providing character addresses to refresh several panels arranged to display a single image is disclosed wherein the addressing circuit includes a circuit for providing a character count across a character line, a circuit for providing a character line count for each panel and a circuit for combining the character count and character line count to provide an address for each character successively along a panel scan line alternating between each respective scan line of the panels.

In the preferred embodmient, the addressing circuit includes a register for storing the character line count for each panel. Further, a switching circuit is disclosed to alternately increment the contents of each panel register.

Further, an addressing circuit is provided for addressing each character font scan line to provide refresh data to the plurality of panels. This font addressing circuit includes a circuit for providing character code data for each character successively located along a panel scan line wherein the character code data circuit provides such character code for each scan line for each of the panels by addressing the data for each line of all the panels in succession. The font circuitry further includes a circuit for providing the scan line count for each character successively along the scan line of each panel. Again, the lines are refreshed by refreshing the same line for all panels before the next refresh line is provided. The font circuit also includes a circuit that combines the character code data and scan line count for each character to form the character font scan line address.

In another embodiment of the present invention, the character address circuit and the font address circuit are combined together with a memory that stores the character codes and a memory that stores the font data to provide a serial data stream representing the pel data for the display panels.

BRIEF DESCRIPTION OF THE DRAWING

The novel features believed characteristic of the invention are set forth in the appended claims. The invention itself, however, as well as other features and advantages thereof, will be best understood by reference to the following description of the preferred embodiment, when read in conjunction with the accompanying figures, wherein:

BEST MODE FOR CARRYING OUT THE INVENTION

Figure 1A:
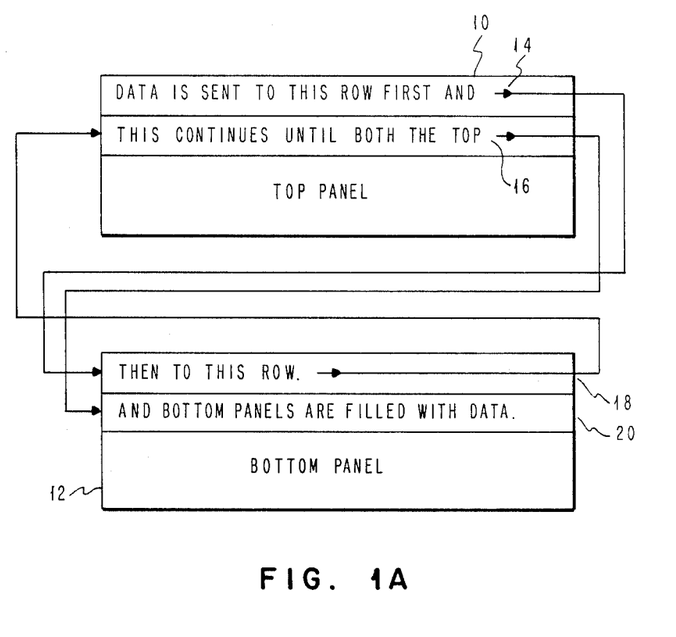
FIG. 1a is an illustration of the refreshing sequence for two display panels.

FIG. 1 illustrates the refreshing scheme for two liquid crystal display panels 10 and 12. The first line of the top panel 10 is refreshed (represented by line 14) and then the first row 18 of the bottom panel 12 is refreshed. Afterwards, the second line 16 of the top panel is refreshed followed by the second line 20 of the bottom panel 12.

FIG. 1a illustrates the difference between refreshing two distinct panels of liquid crystal displays as opposed to refreshing a single panel of a liquid crystal display or of refreshing a cathode ray tube monitor. The data in refreshing a multiple panel display must be sent line by line successively atlernating between each panel. In other words, the first line of the first panel must be refreshed followed by the first line of the second panel and so on until all first lines of all panels have been refreshed. The procedure is then repeated for refreshing the second line of all panels. This procedure is again repeated until all lines of all panels have been so refreshed. If the display image is stored in memory in a memory arrangement resembling the final display image, the addressing of the refresh data must proceed in this successive line alternating across panel fashion. However, this display data is stored in memory that is addressed in sequence from the top of the image to the bottom. For this reason, generating the correct character addresses for the bottom panel lines is not straight-forward.

The present invention provides a center row address register to provide an offset which is added to the character counter to simplify the addressing of characters on lines in the bottom panel.

In the preferred embodiment, each character is defined by a character scan code which occupies all even display memory addresses. Character attributes occupy the odd addresses. The address of the first character scan code of the first position and first row of the bottom panel for an 80 character per line display (having 25 display lines) would be 19 hex divided by 2 (i.e., shift right logical) to equal $0C_{16}$ and them multiplied by 50 (80 decimal) to equal $3C0_{16}$ which would be shifted left logical (multiplied by 2) to equal 780 hex. Since the even memory boundaries are used for the scan codes and the odd boundaries used for the attribute codes, the least significant bit is not used and only $3C0_{16}$ need be stored as the offset. By using this offset, the lines of the bottom panel may be successively addressed with characters of the lines of the top panel to provide a continuous data stream in a manner prescribed by FIG. 1a.

Figure 2:
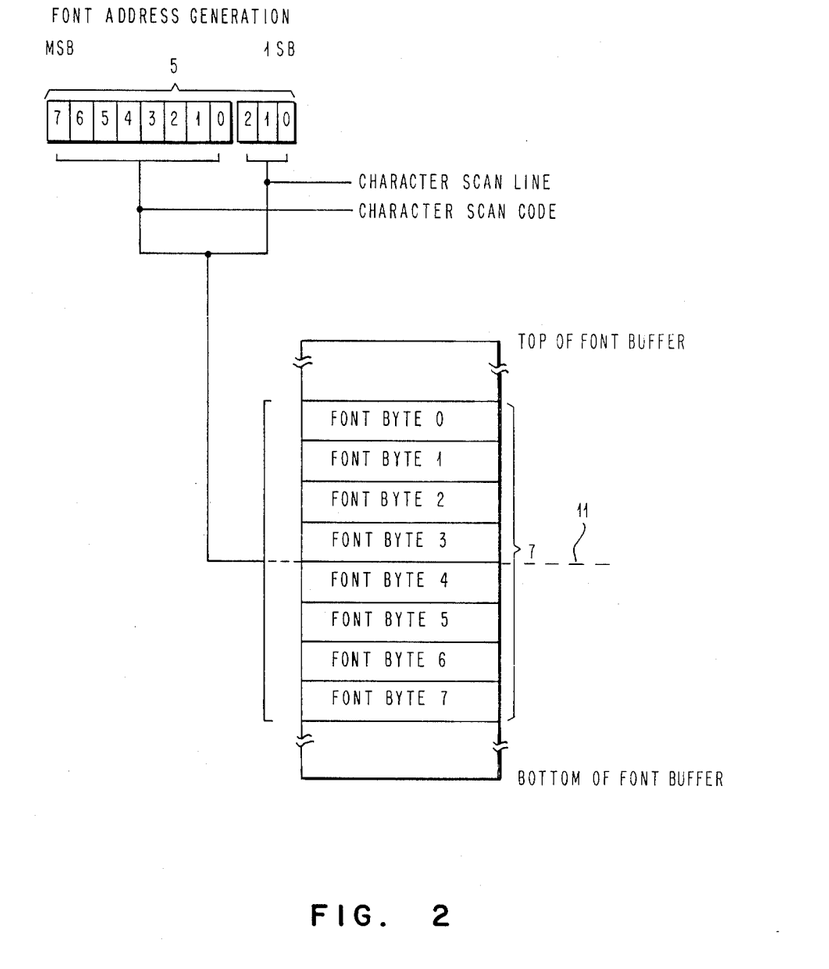
FIG. 2 is a block diagram illustrating the formation of the font address from the character scan code and the character scan line.

Font address generation is dependent upon the scan codes that are accessed by the character addresses of the previously discussed addressing scheme. The scan code is applied to the character scan line of the character presently refreshed. Characters contained in an $8\times 8$ character box are defined by 8 scan line bytes (as illustrated in FIG. 2). Therefore, each successive scan line will be refreshed for each panel in a manner illustrated in FIG. 1a. In an $8\times 8$ matrix, each scan line byte is indexed from 0 to 7 with 0 being the top of the character box and 7 being the bottom (see FIG. 2). Therefore, in this $8\times 8$ embodiment, three bits define the character font scan line. Font address generation for the 3 bit character font scan line is straightforward.

Figure 1B:
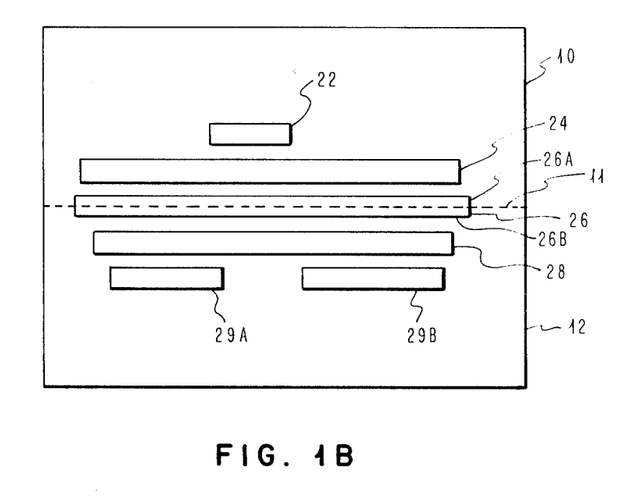
FIG. 1b is an illustration of the two display panels arranged to display a single image of text.

In a two panel liquid crystal display arrangement with an even number of text lines, the character scan line refresh for the top panel is the same one as that being refreshed for the bottom panel. However, when an odd number of text display, such as 22, 24, 26, 28, 29A and 29B, lines are being displayed as illustrated in FIG. 1b, the center character line of the text 26 will be split in half where half 26a of the text line will be displayed in the top panel and half 26b of the text line will be displayed in the bottom panel. Therefore, the top panel bottom series of scan lines will display the top portion of the center text line 26a and the bottom panel will display the bottom series of scan lines for the center text line 26b. In this situation, the addressing of the scan lines for the bottom panel is not straightforward. Ths addressing can be provided for by providing a character box center register which contains an offset to generate the proper font addresses to address the correct character font data for the botom panel. Therefore in an $8\times 8$ character box, this register would be loaded with a 4. Therefore, the first scan line of the first character line of the bottom panel would display font byte 4 instead of front byte 0 (the first scan line for the top panel). By refreshing the top and bottom panel in a manner of FIG. 1a, using the character box center register, the split center character line will be properly displayed.

In the preferred embodiment for an $8\times 8$ matrix, a modulo counter is implemented that counts from 0 to 7. The top panel as the character scan lines progress from 0 to 3, the bottom panel scan lines will progress from 4 to 7. When the top panel character scan line reaches 4, the bottom panel scan line must be 0. In the case of an $8\times 8$ character box, the 3 bit scan line counter being used for the top panel is offset by 4, the value in the character box center register and therefore, when the top panel scan line reaches 4, the bottom panel line is 4+4 or 0 in the modulo 8 adder with the overflow carry signal being ignored since 8 is a number that is an integer power of 2 having an even binary boundary.

However, if the circuitry is to provide different size character boxes such as an $8\times 10$ box, the scan line counter requires additional logic to provide the proper operation of the modulo counter. A 10 count line character box uses 4 bits of a counter. However, to operate properly, a modulo 10 counter would have to count from 0 to 9. A 4 bit counter will not count in this manner. The present invention provides a means to enable this 4 bit counter to act as a modulo N counter where N is any variable. For example, an $8\times 10$ character box as the top panel scan lines increments from 0 to 10, the bottom panel scan line increments from 5 to 9 by directly adding the offset of the value 5 in the character box center register. As the top panel scan line reaches 5, the bottom panels should return to 0 indicating that a new text line is about to commence. Adding the offset value as before does not yield a 0, but rather an A hex. Therefore, after the bottom panel scan line has reached its maximum, the one's complement of the maximum scan line value must be added to the top panel scan line value in addition to adding of the offset value of the character box center register. The one's complement of the maximum scan line value is obtained by inverting each of the bits. A 9 in binary format is 1001 and its one's complement is 0110. So as the top panel's scan line increments from 5 to 9, the bottom panel's goes from 0 to 4 with overflow carries that are ignored. The 4 bit modulo N counter with N will count to 9 for the $8\times 10$ character box case, then resets to 0 for the top panel's scan line to begin a new text line. After the top panel scan line has reached its maximum, the initial method of adding the character box center register offset value is reverted to.

It should be understood that while this example uses an $8\times 10$ character box, this invention will work for any $8\times N$ character box where N is any variable.

The addressing circuitry driving a two panel liquid crystal display which has an odd number of text character lines must also duplicate its addressing registers. It must increment its character addresses for new text lines at different intervals for the top and bottom panels because of the split in the center charcter text line. The bottom panel reaches a new text line while the top panel has just reached the center of its present text line. The addressing registers for the top panel are bumped when a top panel text line is completed and those for the bottom panel are bumped when the bottom panel text line is completed. Since these lines are completed at different times, separate addressing registers are required.

For the case of an even number of text lines, only one set of addressing registers is required since the top text line and the bottom text line will have this same scan line count during refresh.

Figure 3:
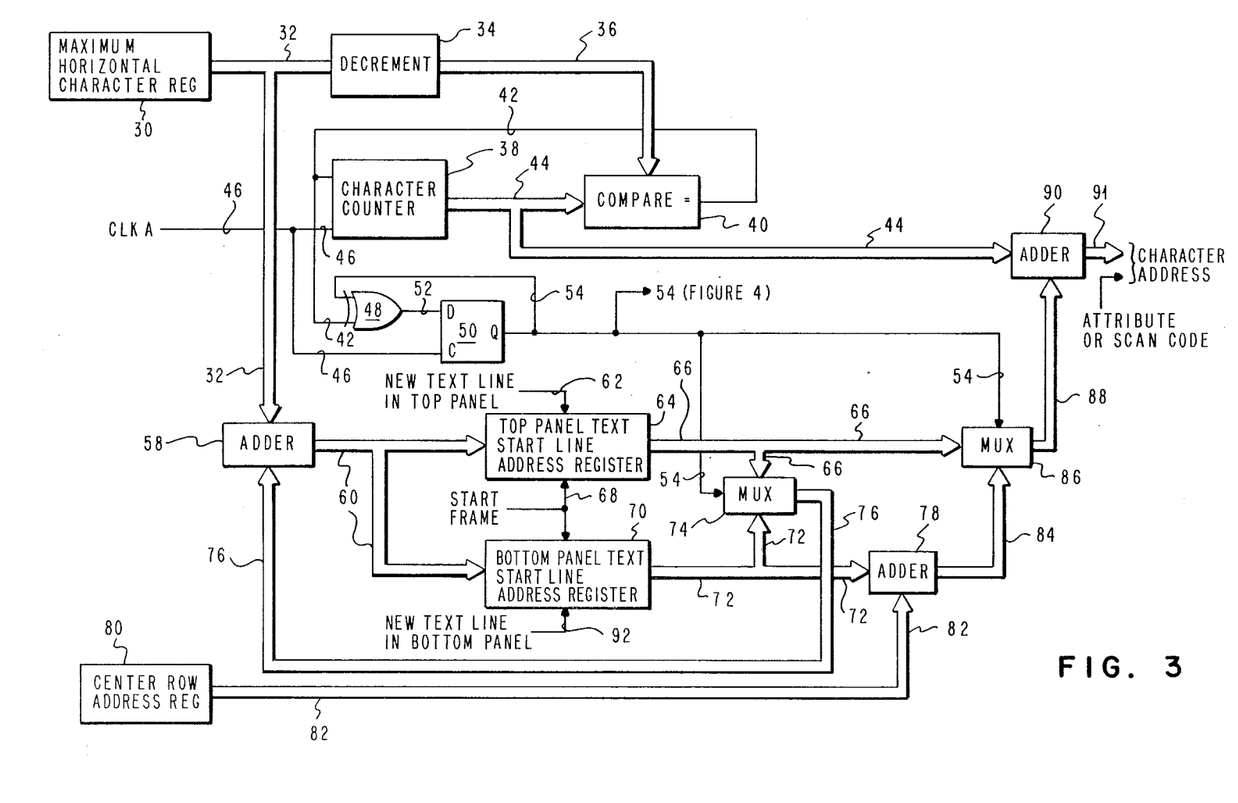
FIG. 3 is a schematic block diagram of the character address circuitry.

FIG. 3 illustrates a schematic block diagram of the character address circuit. In FIG. 3, the maximum number of horizontal characters per line is contained in a register 30. The contents of register 30 is decremented by 1 in a decrement circuit 34 to provide a constant on lines 36 to compare circuit 40. The maximum number of characters per line is also input to an adder 58 by line 32. The character counter 38 is clocked by a signal on line 46 (clock signal A) and increments from the 0 position to the maximum horizontal character register position that is loaded into comparator 40. When comparator 40 determines that the last character of the horizontal line has been incremented, then comparator 40 outputs the signal on line 42 which resets the character counter 38. This signal on line 42 also is input to an exclusive OR gate 48 which provides an output on line 52 to a D flip-flop 50. The output of the D flip-flop on line 54 is also input to the exclusive OR gate 48. The D flip-flop 58 is further clocked by the clock A signal on line 46. The output of the D flip-flop 50 provides the signal indication on line 54 as to whether the characters in the top panel or characters in the bottom panel are being refreshed.

The adder 58 receiving the maximum horizontal character constant from register 30 provides an output to both the top panel text start line address register 64 and the bottom panel text start line address register 70. Both registers 64 and 70 contain the line number that is being refreshed for their respective top or bottom panels. When a frame or image is first being refreshed, a signal is provided on line 68 to indicate a new frame. The signal on line 68 causes registers 64 and 70 to be reset at 0. After each line has been refreshed, the contents of either register 64 or 70 is then incremented by the total number of characters in the line, i.e., the contents of register 30 through adder 58. In this manner, the correct character count is maintained in both registers for both panels.

As previously discussed, the character address for the characters in the bottom panel must be offset by a constant. This constant is contained in the center row address register 80 and is combined by a line 82 and an adder 78 with the contents of the bottom panel text start line address register 70 via line 72. The output from the bottom panel text start line address register 70 is also provided through multiplexer 74 and line 76 to the adder 58 so that the contents of the bottom panel text start line address register 70 will be incremented by the total number of horizontal characters per line, i.e., the contents of register 30. Each line address from either register 64 or register 70 is combined with the character address on that line, i.e., the output of character counter 38 on line 44 in adder 90. The top panel register 64 or bottom panel register 70 is appropriately selected by the multiplexer 86 to provide that output on line 88 to adder 90. The output of adder 90 on line 91 is the character address without the least significant bit position, which, as previously discussed is a 0 for the scan code address or a 1 for the attribute address.

Initially, the circuitry in FIG. 3 starts addressing the first line of the top panel by zeroing the contents of register 64 and incrementing the character counter 38 by clock 8 on line 46. This first line address for the top panel is merely the count output from the character counter 38 that is provided on line 44 to adder 90. Since the contents of the top panel register 64 is 0, the output of adder 90 is the input on line 44 on line 91. After the last character of the first line has been addressed, the compare circuit 40 increments the character counter 38 and also the D flip-flop 50 through exclusive OR gate 48. Character counter 38 begins incementing again from the 0 position of the character line upward. This time the character address is combined with the contents of the bottom panel register 70, which is still 0, through adder 78 which provides the offset, through multiplexer 86 to provide the appropriate character address for the first line of the bottom panel on line 91. After this first line of the bottom panel has been addressed, again the character counter 38 is reset and the output of the D flip-flop 50 changes and the top panel register 64 is loaded with the maximum horizontal character count from register 30 through adder 58 as previously discussed. After the second line has been loaded, the D flip-flop 50 again switches and the maximum horizontal character counter of register 30 is then loaded into the bottom panel of register 70. The alternating between the top panel and the bottom panel registers 64 and 70 respectively continues as each line of characters is addressed for their respective panels.

Figure 4:
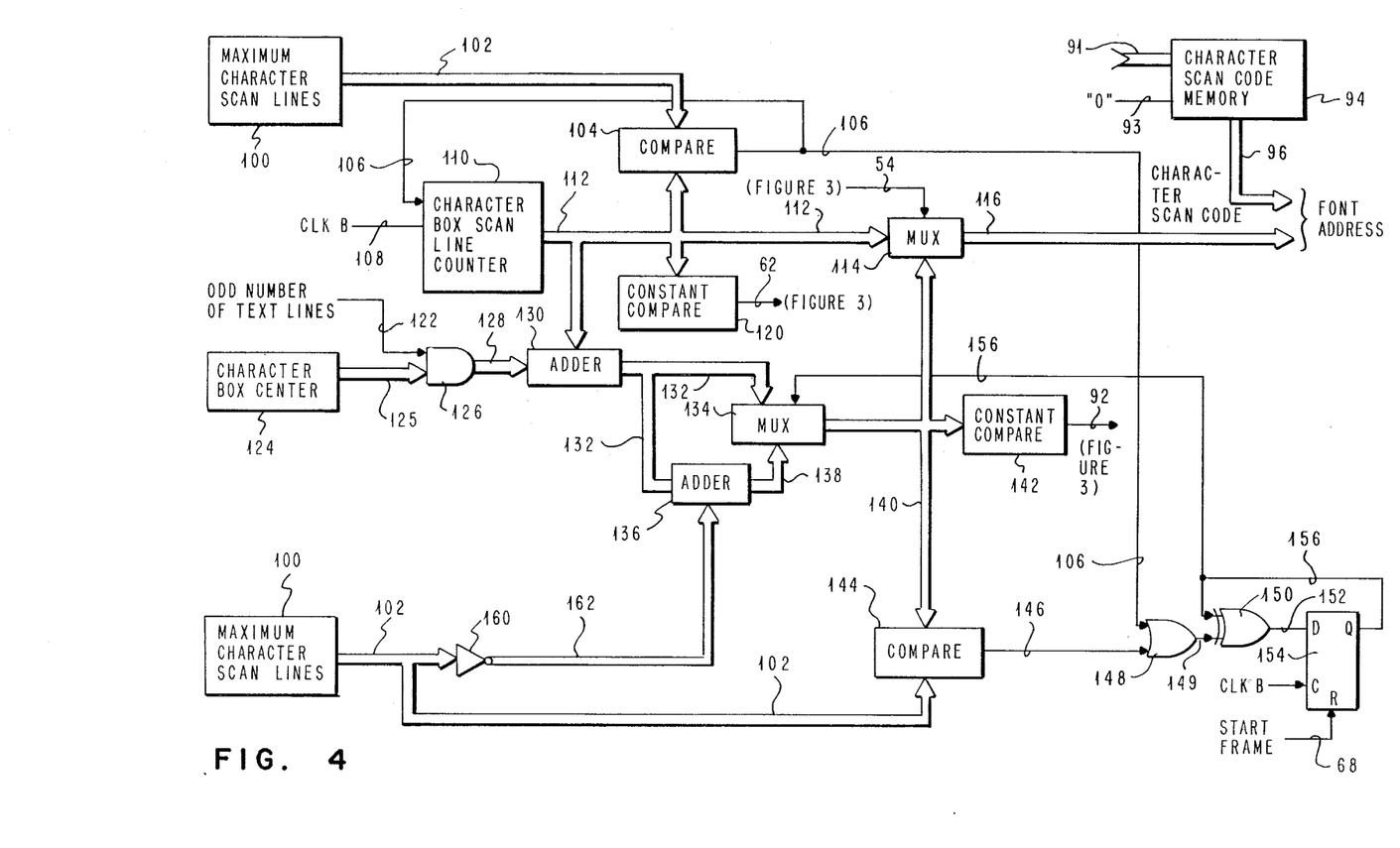
FIG. 4 is a schematic block daigram of the font address circuitry.

The output of th circuitry in FIG. 3 is a character address that accesses both the character scan code and the attribute code as previously discussed. In FIG. 4, the character address output on line 91 together with a binary 0, the least significant bit (on line 93) are both input to a character scan code memory 94 which output a character scan code for that character address on line 96. This character scan code on line 96 is combined with a character scan line number on line 116 to form the font address to access the font scan line data for the character.

The scan line data on line 116 is derived from the remaining circuity in FIG. 4. A register 100 contains the maximum number of scan lines for a character box. This number is provided as a constant on line 102 to a compare circuit 104 which compares this constant with the output of the character box scan line counter 110 on line 112. When the maximum character scan line occurs, the output of the compare circuit 104 provides a signal on line 106 that resets the character box scan line counter 110 and also toggles the D flip-flop 154 through an OR gate 148 and exclusive OR 150. The constant compare circuit line 120 will provide a signal on line 62 to indicate a new text line on the top panel when a zero is output on line 112. The actual count from the character box scan line counter 110 on line 112 is provided as an output on line 116 for the character scan lines in the top panel. The scan lines for the bottom panel are provided to multiplexer 114 via line 140. As previously discussed, scan line count for the character boxes in the bottom panel are computed based on whether or not there is an odd number of character text lines thus requiring a split of a center character text line and if the maximum number of character scan lines is an even binary number.

To illustrate the operation of the circuitry to compute the character scan line for the bottom panel, three examples will be discussed. In the first example, it is assumed that the number of character text lines is even and the number of scan lines per character box is an integer power of 2 or a binary number having an even boundary. In this case, the signal on line 122 would be a 0 indicating an even number of character text lines across the top and bottom panels, and therefore, the output of AND gate 126 would be a 0 on line 128. Also, since the maximum number of scan lines is a binary number having an even boundary, such as 8 or 16, the output on line 102 through inverter 160 would be 0. Therefore, the character box scan line counter 110 output on line 112 would be added in adder 130 to a 0 on line 128, and the character count in counter 110 would be output through multiplexer 134 to multiplexer 114 which provide this number on line 116. In other words, for an even number of character text lines, the character scan line count for the top panel would be the same as the character scan line count for the bottom panel.

In the case where an odd number of character text lines is to be displayed, the center test line would be split between the top and bottom panels as previously discussed. This would require that the bottom panel scan line include an offset. This offset is provided in character box center register 124 which is input on line 125 through the AND gate 126 which is anded with the odd number of character text lines on line 122. The effect of the signal on line 122 is to gate the offset in character box center register 124 to the adder 130 on line 128 when the center text line would be split. In that case, the offset would be added to the character box scan line count on line 112 in adder 130 and provided on line 132.

In a situation where the maximum number of character scan lines is a binary number having an even boundary, i.e., an integer power of 2, this sum from adder 130 on line 132 would be switched through multiplexer 134 on line 140 to multiplexer 114 on line 116. When the last scan line for the character line has been addressed on line 140, the constant compare circuit 142 will increment the bottom panel text start line address register 70 (FIG. 3) on line 92.

If the maximum number of character scan lines is not a binary number with an even boundary, i.e., not an integer power of 2, a modulo offset must be provided to the adder to make it appear as an even binary number so that the modulo adder will automatically return to 0. In the previous example, a 10 or hex A or binary 1010 is used to illustrate this situation. According to this example, the scan lines should count from 0 to 9 and then revert back to 0. A common binary adder of 4 bits, such as would be implemented as adder 136, would not increment back to 0 after 9, but rather to A hex. For this situation, the one's cmplement of the maximum character scan lines is provided as an offset to adder 136 and further the maximum number of character scan lines is provided to compare circuit 144 to allow the adders to return to 0 for a non-even boundary binary number. In other words, the one's complement offset would only be used when the scan line count for the bottom panel must be returned through a 0. The following Table 1 illustrates the operation of the circuit of FIG. 4 in this example.

TABLE I

| TOP PANEL SCAN LINE | CHAR BOX CENTER | 1'S COMPLEMENT OF MAX SCAN LINE | ADD 1'S COMPLEMENT | BOTTOM PANEL SCAN LINE |
|---|---|---|---|---|
| 0 | 5 | 6 | NO | 5 |
| 1 | 5 | 6 | NO | 6 |
| 2 | 5 | 6 | NO | 7 |
| 3 | 5 | 6 | NO | 8 |
| 4 | 5 | 6 | NO | 9 (MAX) |
| 5 | 5 | 6 | YES | 0 |
| 6 | 5 | 6 | YES | 1 |
| 7 | 5 | 6 | YES | 2 |
| 8 | 5 | 6 | YES | 3 |
| 9 (MAX) | 5 | 6 | YES | 4 |
| 0 | 5 | 6 | NO | 5 |

Figure 5:
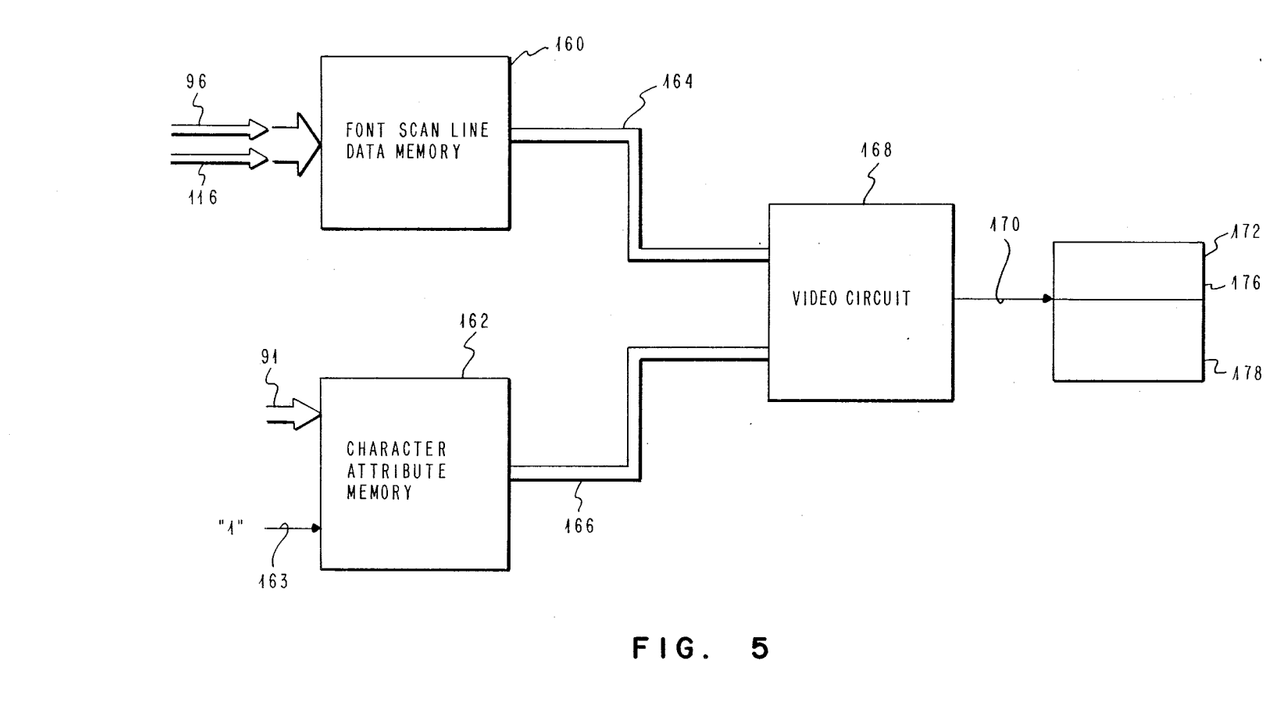
FIG. 5 is a system block diagram illustrating the generation of the video data.

FIG. 5 illustrates the video circuit 168 connected to the font scan line data memory 160 and the character attribute memory 162. The font scan line data memory receives the font address on lines 96 and 116 that address the font scan data in memory 160 which is output on line 164. The attribute data is addressed by the character address on line 91 with the 1 designating the attribute address as its lowest significant bit on line 163. Therefore, for each character font scan line data output on line 64, there is corresponding character attribute data on line 166. Attributes for character displays would include such features as reverse video or blinking or other attributes. The attribute is used to qualify the character front scan line data in the video circuit 168. Once qualified, the video circuit 168 will provide a serial stream of video data on line 170 to a display 172 consisting of liquid crystal display panels 176 and 178. The video circuit may be any video circuit that combines the font scan line data and the attribute data, such as the IBM PC monochrome card which is described in the *IBM PC Technical Reference Manual* herein incorporated by reference.

Although the invention has been described with reference to this specific embodiment, this description is not meant to be construed in a limiting sense. Various modifications of the disclosed embodiment, as well as other embodiments of the invention, will become apparent to those persons skilled in the art upon reference to the description of this invention. It is, therefore, contemplated that the appended claims will cover any such modifications or embodiments as fall within the true scope of the invention.

I claim:

1. An addressing circuit for providing character addresses to refresh a plurality of adjacent panels arranged to collectively display a single image, said circuit comprising:

first means for providing a character count across a character line;

second means for providing a character line count for each panel; and, third means connected to said first and second means for combining the character count and character line count to provide an address for each character successively along a panel scan line successively alternating between the panels on respective scan lines thereof.

2. An addressing means according to claim 1 wherein said combining means includes means for containing the start address of the first character and the first line for each panel.

3. An addressing means according to claim 2 wherein the containing means includes a register for each panel and switching means to alternatively increment the contents of each panel register.

4. An addressing circuit for providing a character font scan line address to refresh a plurality of adjacent panels arranged to collectively display a single image, said circuit comprising:

first means for providing character code data for each character successively along a panel scan line successively alternating between the panels on respective scan lines thereof;

second means for providing a scan line count for each character successively along a panel scan line successively alternating between the panels on respective scan lines thereof; and third means connected to said first and second means for combining the character code data and scan line count for each character to form the character font scan line address.

5. An addressing circuit according to claim 4 wherein said scan line count means includes means to provide the scan count for a character divided between at least two panels.

6. An addressing circuit according to claim 5 wherein said scan line count means includes means for providing a count for N maximum number of character scan lines where N is any variable number.

7. A circuit providing video data data to refresh a plurality of adjacent panels arranged to collectively display a single image, said circuit comprising:

first addressing means for providing character code addresses for each character of the image successively for each scan line successively altenating between the panels on respective scan lines thereof;

a first memory means connected to said first addressing means for providing a character code for each character code address;

a second addressing means for providing character font scan line addresses for each character of the image successively for each scan line successively alternating betwen the panels on respective scan lines thereof;

a second memory means connected to said second addressing means for providing a font scan line data for each font scan line address; and third means connected to said first and second memory means for forming video data from the font scan line and said character code data and providing the video data to the panels.

* * * * *

UNITED STATES PATENT AND TRADEMARK OFFICE
CERTIFICATE OF CORRECTION

PATENT NO. : 4,742,347

DATED : May 3, 1988

INVENTOR(S) : A. Arismendi

It is certified that error appears in the above-identified patent and that said Letters Patent is hereby corrected as shown below:

Col. 8, line 59, delete "data data" and insert --data--.

Signed and Sealed this

Fourth Day of February, 1992

Attest:

HARRY F. MANBECK, JR.

*Attesting Officer*          *Commissioner of Patents and Trademarks*